United States Patent [19]

Vernhet et al.

[11] Patent Number: 4,636,859

[45] Date of Patent: Jan. 13, 1987

[54] DIDON DIGITAL DEMODULATOR

[75] Inventors: Jean Vernhet, Cesson Sevigne; Tristan de Couasnon, Betton, both of France

[73] Assignee: Thomson CSF, Paris, France

[21] Appl. No.: 708,815

[22] Filed: Mar. 5, 1985

[30] Foreign Application Priority Data

Mar. 9, 1984 [FR] France ................... 84 03636

[51] Int. Cl.$^4$ ............... H04N 7/093; H03K 9/00
[52] U.S. Cl. ................... 358/147; 329/104; 375/94
[58] Field of Search ........... 358/141, 142, 147, 146; 375/94; 329/104

[56] References Cited

U.S. PATENT DOCUMENTS

| | | | |
|---|---|---|---|
| 4,034,404 | 7/1977 | Nakagome et al. | 358/142 |
| 4,199,656 | 4/1980 | Saylor. | |
| 4,242,755 | 12/1980 | Gauzan. | |
| 4,302,845 | 11/1981 | McClaughry et al. | |
| 4,303,941 | 12/1981 | Marti et al. | 358/147 |
| 4,358,846 | 11/1982 | Morgan. | |

FOREIGN PATENT DOCUMENTS 2496376 6/1982 France.

OTHER PUBLICATIONS

Funkschau, vol. 49, No. 19, pp. 62–67, 9/1977.
Proceedings of the IEE, vol. 126, No. 12, 12/1979, pp. 1374–1396.

Primary Examiner—Jin F. Ng
Attorney, Agent, or Firm—Cushman, Darby & Cushman

[57] ABSTRACT

A DIDON Digital demodulator includes an input analog-to-digital conversion device which supplies n samples (n being at least equal to 4) during a DIDON period, and an identification device which involves shifts at the sampling frequency in order to search and detect groups of n successive samples which are probably representative of DIDON signals. The probability criteria are a function of the structure of the group under study and of the nature of the DIDON signal which said group may represent in comparison with the nature of the DIDON signal represented by the group which precedes this signal by a DIDON period. The identification device outputs a configuration probability signal and a configuration signal. The configuration signal is received by a data regenerating circuit which then regenerates a data signal and a clock signal when the identification device determines that the configurations are probably DIDON signals.

7 Claims, 10 Drawing Figures

| AD | | | | | | | | | DO | |
|---|---|---|---|---|---|---|---|---|---|---|
| 0 0 | 0 | 0 | 0 | 0 | 0 | 0 | 0 | | 0 | 0 |
| 0 0 | 0 | 0 | 0 | 0 | 0 | 0 | 1 | | 0 | 0 |
| 0 0 | 0 | 0 | 0 | 0 | 0 | 1 | 0 | | 0 | 0 |
| 0 0 | 0 | 0 | 0 | 0 | 0 | 1 | 1 | | 0 | 0 |
| 0 0 | 0 | 0 | 0 | 0 | 1 | 0 | 0 | | 0 | 0 |
| 0 0 | 0 | 0 | 0 | 0 | 1 | 0 | 1 | | 0 | 1 |
| 0 0 | 0 | 0 | 0 | 0 | 1 | 1 | 0 | | 0 | 1 |
| 0 0 | 0 | 0 | 0 | 0 | 1 | 1 | 1 | | 0 | 1 |
| 0 0 | 0 | 0 | 0 | 1 | 0 | 0 | 0 | | 0 | 1 |
| 0 0 | 0 | 0 | 0 | 0 | 0 | 0 | 1 | | 0 | 1 |
| ⎰ | ⎰ | | | | | | | | ⎰ | |
| 0 0 | 1 | 0 | 0 | 0 | 0 | 0 | 0 | | 0 | 0 |
| 0 0 | 1 | 0 | 0 | 0 | 0 | 0 | 1 | | 0 | 0 |
| 0 0 | 1 | 0 | 0 | 0 | 0 | 1 | 0 | | 0 | 0 |
| 0 0 | 1 | 0 | 0 | 0 | 0 | 1 | 1 | | 0 | 0 |
| 0 0 | 1 | 0 | 0 | 0 | 1 | 0 | 0 | | 0 | 0 |
| 0 0 | 1 | 0 | 0 | 0 | 1 | 0 | 1 | | 1 | 0 |
| 0 0 | 1 | 0 | 0 | 0 | 1 | 1 | 0 | | 1 | 0 |
| 0 0 | 1 | 0 | 0 | 0 | 1 | 1 | 1 | | 1 | 0 |
| 0 0 | 1 | 0 | 0 | 1 | 0 | 0 | 0 | | 1 | 0 |
| 0 0 | 1 | 0 | 0 | 1 | 0 | 0 | 1 | | 1 | 0 |
| ⎰ | ⎰ | ⎰ | | | | | | | ⎰ | |

Fig. 1b

DIDON DIGITAL DEMODULATOR

BACKGROUND OF THE INVENTION

1. Field of the Invention

The present invention relates to the reception of DIDON data and in particular to a DIDON decoder which comprises a demodulator followed by a demultiplexer. The demodulator receives the television signal, for example from the peritelevision socket connector of a standard television receiver and has the function of delivering at its outputs a binary train of data, a binary clock signal in phase with the bits of the binary train, a validation signal and a line-synchronization signal. The demultiplexer which follows the demodulator has the functions of "chopping" or separating the data of the binary train into octets by detecting the particular configuration of the "synchro-octet" octet, of recognizing the identifier of the source of information for which it is programmed, and of delivering at its outputs data octets derived from said source and excluding data derived from other sources from which the data are transmitted by time-multiplexing in the television signal in the same manner as the data of the source considered.

The invention is more specifically concerned with a particular structure of the DIDON digital demodulator.

2. Description of the Prior Art

A few preliminary remarks recalling the basic principles of the DIDON system will prove useful in order to gain a clear understanding of the description given hereinafter.

The transmission of digital information by radio-wave broadcasting and if necessary with time-multiplexing between a number of sources in accordance with the DIDON procedure will be considered in the case in which the transmission carrier is the television signal. In the DIDON procedure, the digital information is chopped so as to form packets. One packet is transmitted per horizontal scanning line and one complete packet emanates from one source alone. The information contained in a packet is regrouped so as to form octets. The packet is characterized by its header which comprises in sequence: two octets which are characteristic of the binary frequency (synchronization burst), one octet for initialization of chopping into octets ("synchro-octet" octet), three octets for identification of the packet and two octets for validation of the packet (one continuity-index octet and one useful-data format octet). The useful-data octets follow the packet header.

The demodulators employed in the DIDON procedure possess knowledge of the binary nature of the signal to be detected and are provided with the spectral information of the synchronization burst. The design function of these demodulators is to identify the data-transmission lines, to restitute the binary levels and to regenerate the clock signal in phase with the data.

The spectrum of the so-called NRZ (nonreturn to zero) signal is continuous, has a first zero at the binary frequency and conveys 80% of the energy of the signal between the continuum and the binary half-frequency. Detection of the binary half-frequency is therefore characteristic of the presence of a line of data. This search for the binary structure is facilitated at the start of a packet by the structure of the first two octets of the header constituted by sixteen "ones" and "zeros" in alternate sequence. It is readily apparent that, in some parts of the image, the signal of the televised program can transport a spectral line at a binary half-frequency. Identification of the data packet is therefore necessarily vitiated by a certain probability of errors which is usually minimized by permitting search and detection only during opening of a window initiated by means of the horizontal synchronization signal and surrounding the presumed position of the binary synchronization burst. The validation signal is produced at the instant of detection.

The transitions of the burst signal on a data-transmission line are employed for regenerating the binary clock signal which is intended to be maintained throughout the time-duration of the data packet.

A variant of these arrangements consists in converting the NRZ signal to a so-called RZ signal (that is, with Return to Zero). The spectrum of a signal of this type has the distinctive property of being constituted by a continuous spectrum in which the initial zero has twice the binary frequency, and on which is superimposed a spectrum of lines having odd-numbered integral multiples of the binary frequency. An oscillating circuit which is resonant at the binary frequency therefore makes it possible both to detect the presence of data and to regenerate the binary clock signal. However, the entire packet must necessarily carry a sufficient number of transitions to ensure that the oscillations are maintained along the entire line.

The binary levels are identified by comparison between the signal transmitted over a data line and a threshold.

The data signal at the output of the television receiver is evaluated by means of its "eye diagram". It is recalled that the eye diagram is the superposition during a single binary period of all the bits transmitted over a sufficiently long time interval. The amplitude and phase distortions sustained by the signal throughout the transmission together with the added noise produce a contraction of the eye diagram both vertically and horizontally. Restitution of the binary levels will therefore be more reliable as the threshold and sampling instant are more accurately centered on the axes of maximum opening of the eye.

Automatic gain control of the television receiver has the effect of considerably modifying the amplitude of data as a function of the mean luminance of the image. Under extreme conditions, the variation in amplitude is 9-dB.

By reason of the vertical contraction of the eye diagram and of the automatic gain control of the television receiver, the threshold is necessarily adaptive.

By reason of the horizontal contraction of the eye diagram, the regenerated clock phase must be as accurate as possible.

Different DIDON demodulators are known at the present time.

The Thomson-Efcis integrated circuit TEA 2585/86 makes use of an oscillating circuit at the frequency FB/2 (where FB is the binary frequency of the DIDON signal; this frequency is an integral multiple of the television line frequency) for the purpose of identifying the line of data. The binary clock signal is delivered by a quartz oscillator at the frequency 2.FB, followed by a logic system for selecting from the four transitions which are present in the same period the particular transition which is nearest the vertical axis of the eye diagram. The circuit detects the mean value of the binary synchronization burst in order to define the threshold with respect to the horizontal axis of the eye diagram. In this demodulator, the threshold has relatively low sensitivity to noise and the clock signal is maintained stable irrespective of the data content. On the other hand, the clock phase is lacking in accuracy.

The integrated circuit SN 96533 produced by Texas Instruments utilizes an oscillating circuit which is resonant at the frequency FB and is excited by a signal with return to zero (RZ). The circuit detects the peak value of the synchronization burst in order to define the threshold. In this demodulator, the clock signal is extracted from the RZ signal itself, with the result that its phase is well-adapted to the eye diagram and follows the fluctuations of the signal. On the other hand, the threshold is sensitive to noise by reason of the peak detection and the clock signal is degenerated if the data signal carries only a small number of transitions.

The demodulator with discrete components produced by CCETT utilizes an open delay-line for identifying by correlations the binary half-frequency synchronization burst. The binary clock signal is delivered by a quartz oscillator at the frequency 8.FB, followed by a scale-of-eight divider in phase with a leading edge of the identified burst. The threshold is defined by detection of the mean value of the burst. In this demodulator, the threshold is relatively insensitive to noise. The clock is stable irrespective of the structure of the data signal and its phase is relatively precise. On the other hand, the clock is not automatically adapted to the data signal since its phase is established once and for all at the beginning of the line.

Among these known demodulators, the type last mentioned, or in other words the demodulator comprising discrete components, is best suited for reception of a signal in which the eye closes or contracts. This demodulator is utilized at the present time as a reference circuit. Monolithic circuits do not have the requisite quality for receiving signals in a disturbed medium. The Thomson circuit offers better noise resistance than the Texas Instruments circuit which, on the other hand, does afford higher resistance to phase distortions than the Thomson circuit.

All these known demodulators call for fine adjustments at works (oscillating circuits, clock phase, phase of validation with respect to line synchronization, some of which involve compromise solutions); they are subject to variations in time.

Furthermore, since they are of the analog type, these demodulators are sensitive to temperature variations.

SUMMARY OF THE INVENTION

The present invention is directed to a demodulator which makes it possible to circumvent or at least to reduce the disadvantages of known demodulators.

This objective is achieved by searching for probable shapes of the DIDON signal in the data signal itself, by utilizing differential characteristics for this purpose, and by making use of logic circuits.

According to the present invention there is provided a DIDON digital demodulator comprising an analog-to-digital conversion device for receiving a television video signal and delivering at the frequency $n \times FB$ (n being a positive whole number at least equal to 4 and FB being the binary frequency of the DIDON signal) successive intersample signals which are representative of the progressive variation of a video signal from one sampling period to the next. The demodulator further comprises an identification device for identifying as a function of pre-established criteria the configurations of n successive inter-sample signals which are representative of a DIDON signal and for delivering on the one hand configuration probability signals and on the other hand configuration signals which correspond to low-high "+" and high-low "−" transitions, and to high and low stable states of the DIDON signal. A data-regenerating circuit is also provided for receiving the configuration signals and regenerating a data signal and a clock signal when the configurations are probable.

BRIEF DESCRIPTION OF THE DRAWINGS

Other features of the invention will be more apparent to those skilled in the art upon consideration of the following description and accompanying drawings, wherein:

FIg. 1b is a "data relative to addresses" table given in relation to a memory of FIG. 1a ;

FIG. 2a–2c provide graphic representations of signals obtained by means of the device of FIG. 1a;

FIGS. 3a, 5 and 6 are more detailed diagrams of elements of FIG. 1a ;

FIG. 3b is a "data relative to addresses" table given in connection with a memory of FIG. 3a;

FIG. 4 is a time-waveform diagram relating to the demodulator shown in FIG. 1a.

In the different diagrams, the devices for precise synchronization in accordance with current technology have not been illustrated in order to ensure enhanced clarity of the drawings as well as to simplify the description.

DETAILED DESCRIPTION OF THE INVENTION

Figure 1A:
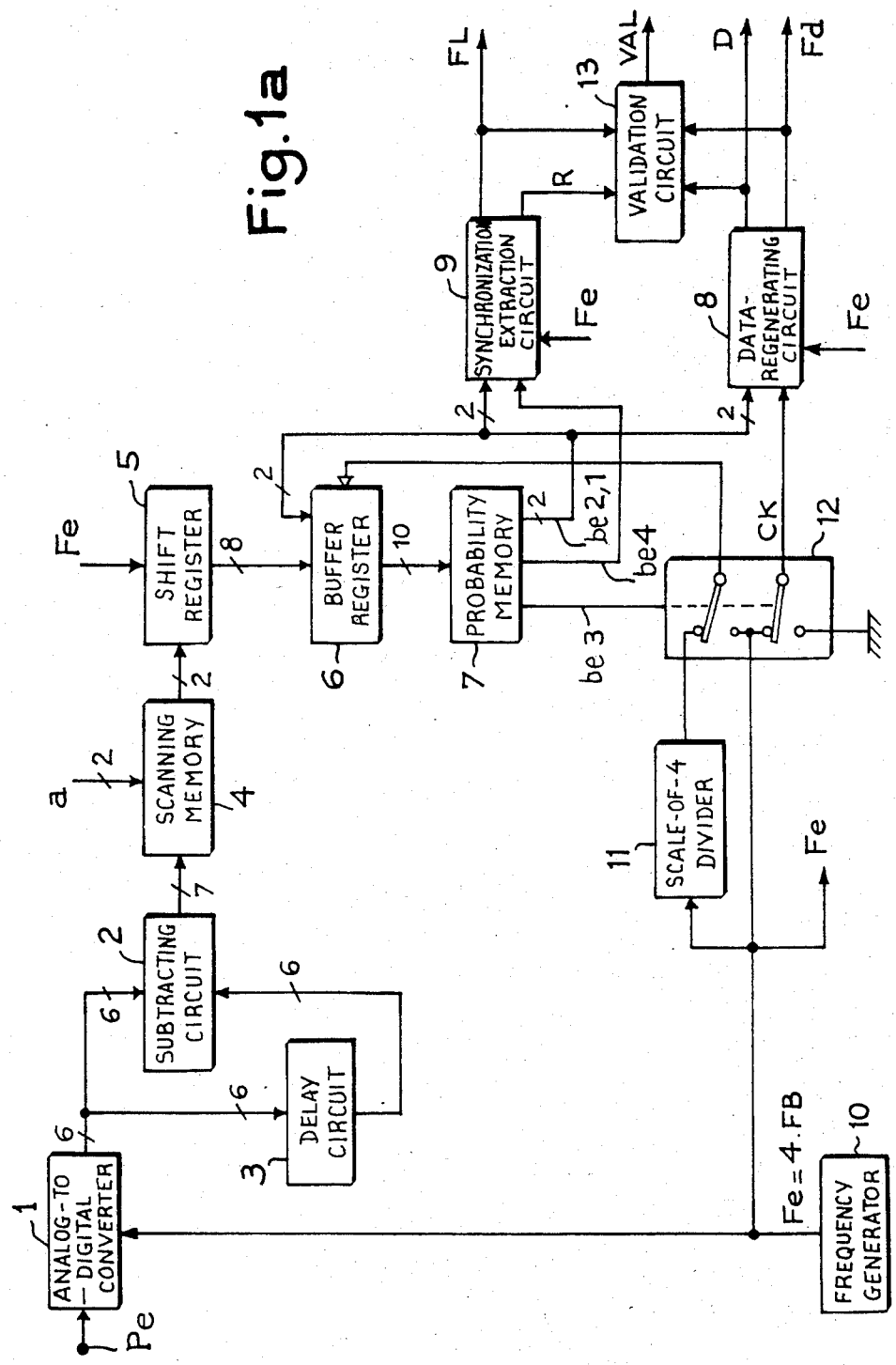
FIG. 1a is a general diagram of a DIDON demodulator in accordance with the invention.

A general diagram of a DIDON demodulator is given in FIG. 1a.

FIG. 1a shows a peritelevision socket connector Pe of a standard television receiver which delivers a video signal Sv. This video signal is sampled at four times the DIDON binary frequency and coded by six binary elements or bits (designated as be in the accompanying drawings) by means of an analog-to-digital converter 1 in which the sampling frequency $Fe = 4.FB$ (where FB is the DIDON binary frequency) is supplied by a frequency generator 10.

The inter-sample differences are computed at an interval of T/4, where T is the DIDON period (T=1/FB) by means of a subtracting circuit 2 which performs a subtraction between the sample which it receives directly from the converter 1 and the preceding sample delayed by T/4 by a delay circuit 3.

In the different diagrams, the multiwire connections between two circuits are represented by a continuous line intersected by a short diagonal stroke next to which is indicated the number of conductors of the connection, for example six conductors for each connection which terminates at the two inputs of the subtracting circuit 2.

A scanning memory 4 comprising a programmable read-only memory (PROM) having a capacity of $512 \times 2$ is programmed in four pages corresponding to four comparison thresholds selected by a control signal a which is a function of the noise and can be generated by the microprocessor. Said microprocessor is usually placed downstream of the DIDON demultiplexer which is in turn placed at the output of the DIDON demodulator. Provision is also made for a manual control device comprising two switches for delivering the threshold value a to the memory 4. This memory scans the signals delivered by the subtracting circuit 2 in accordance with three criteria: zero, positive, negative differences which will hereinafter be designated by the notations 0, + and −. At the output of the memory 4, these differences are represented by samples (at the frequency Fe) of two bits: 00, 01 and 10 respectively in respect of the zero, positive and negative differences.

The video signal Sv processed by the converter 1 is delivered by a conventional television receiver in which the automatic gain control makes it possible for the data level 1 to vary within the range of 350 to 2100 mV whilst the level 0 remains aligned with the video black level. The converter 1 which codes with six bits (binary elements) the representation of $2^6=64$ coding levels therefore determines a coding quantum of the amplitude of 2100/64 = 33.3 mV. The lowest peak will therefore attain the level 11 and the comparison threshold a of the intersample differences will be fixed at the level 5. In the case of the highest-amplitude video signals, the peak will almost attain the level 64. A higher degree of accuracy of measurement of the inter-sample differences can accordingly be achieved by fixing the threshold at one-quarter of the coding scale (level 16). Two other thresholds are defined in the case of intermediate amplitudes of the video signal Sv. One page in the scanning memory 4 corresponds to each of these thresholds and the memory indicates, as a function of the address determined by the output signal of the subtracting circuit 2:

difference 0 if the address is lower than the threshold at absolute value;

difference − or + according to the sign of the output signal of the subtracting circuit if the address is higher than the threshold at absolute value.

FIG. 1b is a table of eleven columns representing the "data DO relative to addresses AD" of the memory 4 of FIG. 1a. The first two columns correspond to the page of the memory chosen, namely the page determined by the value of the signal a. In FIG. 1b, there is shown only the page 00 corresponding to the threshold of level 5. The third column corresponds to the sign of the signal delivered by the subtracting circuit 2 and columns 4 to 9 correspond to the absolute value of the same signal. Columns 10 and 11 relate to the memory data. Two horizontal lines represent the thresholds (+5 and −5) of the memory page considered.

A shift register 5 receives the samples from the memory 4. The register 5 provides four two-bit positions. The register 5 receives respectively on its two accesses the two bits of the output samples of the memory 4, thus defining scanning windows formed of four successive samples. Successive scanning windows are defined by drift, at the sampling frequency Fe, of the train of samples of two bits delivered by the memory 4. There are therefore eighty-one possible configurations of the four two-bit samples in the scanning window. As has been noted earlier, each of the four samples of a window can in fact assume one of the values 00, 01 and 10 (the value 11 is excluded in the case of the samples), thus resulting in $3^4=81$ possible configurations in one window.

Among the eighty-one possible configurations in a scanning window, some of these configurations are representative of a DIDON signal (probability criterion) whereas this is not the case with other configurations (improbability criterion). FIG. 2 shows a partition of fifty-one out of the eighty-one possible configurations in the scanning window. In this figure, the samples 00, 01 band 10 are represented respectively by a horizontal stroke, a left-to-right upward diagonal stroke and a left-to-right downward diagonal stroke. These three types of strokes have the same horizontal projection.

Figure 2A:
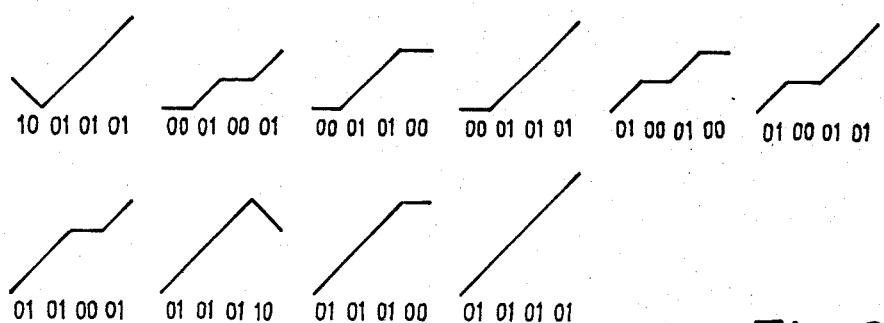

FIG. 2a represents the ten scanning-window contents which are considered as being representative of a "+" transition of the DIDON signal (positive variation during the window). The criterion for determination of the "+" transition is that there should be present in the window at least three samples 01 which are either juxtaposed or separated by a sample 00 or else that there should be present two samples 01 associated with two nonjuxtaposed samples 00.

Figure 2B:
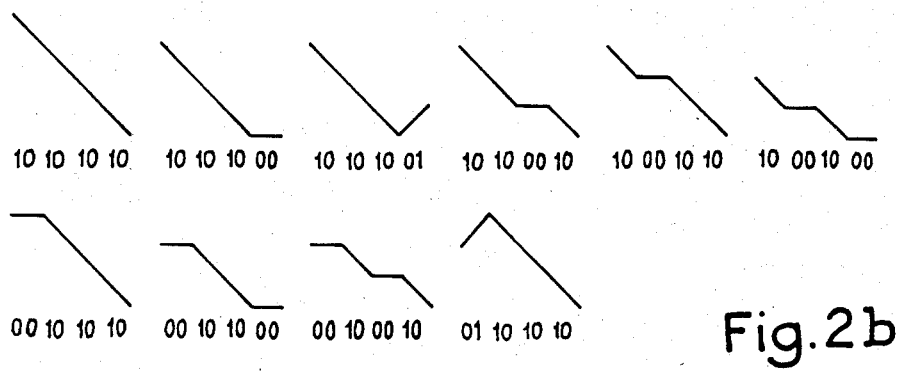

FIG. 2b represents the ten scanning-window contents which are considered as being representative of a "−" transition of the DIDON signal (negative variation within the window). The criterion for determination of "−" transition is the same as for the "+" transition but the samples 01 are replaced by the samples 10.

Figure 2C:
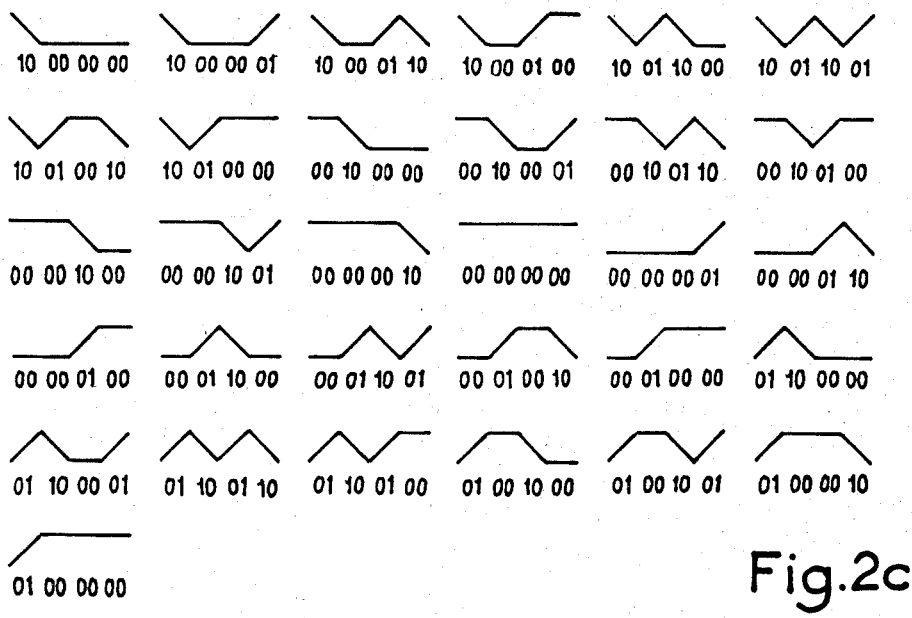

FIG. 2c represents the thirty-one scanningwindow contents which are considered as being representative of a stable state of the DIDON signal (no variation within the window). The criterion for determination of a stable state is that there should be present in the window a maximum of one sample 01 (or 10) or at most one sample 01 and one sample 10 or at most two samples 01 (or 10) but separated by a sample 10 (or 01). The thirty-one other possible contents of the window, such as 10-10-00-00, are not considered as being representative of a DIDON signal.

A probability memory 7 as shown in FIG. 1a and constituted by a programmable read-only memory (PROM) having a capacity of 1024×4 is programmed as a function of the table of FIG. 2. The output signals of the shift register 5 are fed to the PROM memory 7 via a buffer register 6.

By means of two configuration bits be 2,1, the memory 7 indicates the configurations which are probably representative of a "+" transition (code 01: bel=1 and be2=0), of a "−" transition (code 10) from a high stable state (code 11) and from a low stable state (code 00). It should be noted that a stable state is said to be high if the first transition which precedes it is a "+" transition and is said to be low if this transition is a "−" transition. By means of a third bit be3, the memory 7 indicates the improbable configurations or in other words those configurations which are not identified as being representative of a DIDON signal. By means of a fourth bit be4, the memory 7 also indicates the "−" transitions. This will make it possible to extract the line synchronization in the circuits downstream of the probability memory.

When a configuration is probable (see table of FIG. 2) and subject to certain conditions indicated below, the action of the memory 7 is maintained during four sampling periods by means of a double electronic switch 12 which is controlled by the signal be3 and which receives the sampling signal on a first input at the frequency Fe. On a second input, said double switch receives a signal having a frequency Fe/4 obtained by passing the sampling signal through a frequency divider 11 having a division ratio equal to 4. The first output of the switch 12 delivers the signal for transfer control of the register 6:a sampling signal having a frequency Fe if the configuration studied by the memory 7 is improbable (be3=1) and a signal having a frequency Fe/4 if the configuration is probable (be3=0). The second output of the switch 12 delivers a signal CK which is the sampling signal when be3=0 and which has a zero value when be3=1. The action of the memory 7 is thus initiated at intervals of four sampling periods or of one period, depending on whether the configuration in the scanning window is probable or improbable.

The probability of a DIDON signal also depends on the shape detected during the preceding DIDON period. Thus a "−" transition (code 10 for be 2,1) or a high stable state (code 11 for be 2,1) are incompatible with a "−" transition detected in the preceding period. Similarly, a "+" transition (code 01 for be 2,1) or a low stable state (code 00 for be 2,1) are incompatible with a "+" transition detected during the preceding period. So far as a high stable state is concerned, this state is compatible only with a high stable state or a "−" transition detected during the following period whereas a low stable state is compatible only with a low stable state or a "+" transition detected during the following period.

In order to take into account the configuration during the preceding period, the memory 7 of FIG. 1a is a memory divided into four pages and these pages are addressed by the value of the code supplied by the signal be 2,1 or in other words by the code read during the preceding period and sent to the input of the register 6. In each page, the configurations which are probable but incompatible with the preceding configuration are declared improbable and initiate fresh addressing of the memory 7 at the sampling frequency Fe (signal be3=1). It should be noted that, by means of the signal be4, the memory 7 indicates not only the "−" transitions which are compatible with the preceding configurations but also the "−" transitions which immediately follow a low stable state (be 2,1=00) and which are significant of the line synchronization.

The DIDON data signal D and the binary clock signal Fd (with Fd=FB) in phase with the elements of the data signal are restituted by a data-regenerating circuit 8 which receives the signals be 2,1, CK and Fe. This dataregenerating circuit is shown in FIG. 3a and will be described hereinafter.

The line synchronization signal FL is produced by means of a synchronization extraction circuit 9 which will be described hereinafter and which receives the signals be 2,1 and be4 from the memory 7 and the sampling signal Fe from the frequency generator 10.

It is worthy of note that, when the lines of the television signal do not carry data, they usually carry video, the transitions of which are detected. It is not totally improbable that some of these transitions are representative of an NRZ (nonreturn-to-zero) signal during one line. This signal is clearly without significance but could be processed as a DIDON signal by the demultiplexer which follows the demodulator. It is therefore essential to generate a data-validation signal for ensuring that the line really carries data. The validation signal VAL is accordingly delivered by the validation circuit 13 of FIG. 1a which will hereinafter be described in detail. This circuit receives the DIDON data signals D and the binary clock signal Fd delivered by the circuit 8 and the output signals of the circuit 9.

Figure 3B:
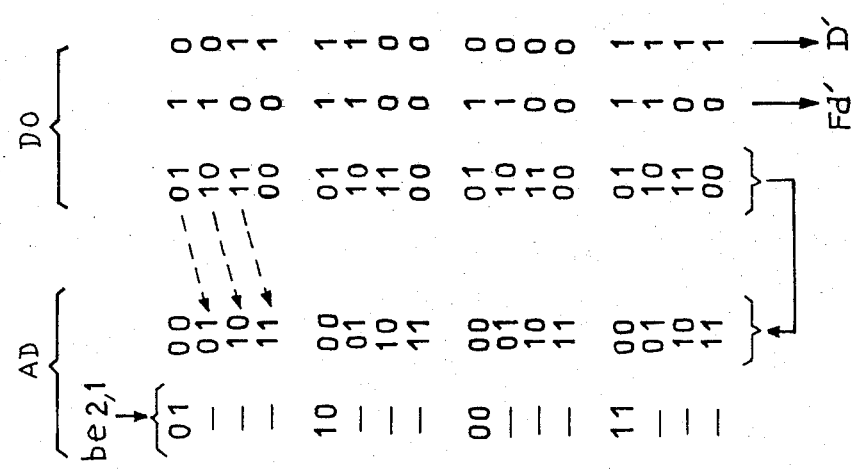
Figure 3A:
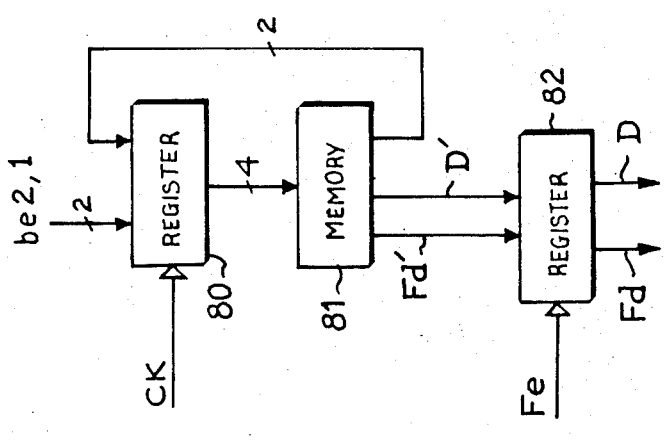

FIG. 3a shows the mode of construction of the data-regenerating circuit 8 of FIG. 1a. This circuit is constituted by a PROM 81 (programmable read-only memory) having a capacity of 16×4 preceded by a four-cell buffer register 80 and followed by a two-cell buffer register 82. The register 80 is controlled by the signal CK delivered by the second output of the switch 12. Thus the register 80 is controlled at the sampling frequency in the event of probability of the configuration studied by the memory 7 (be3=0 and CK=Fe) or maintained in its previous state in the event of improbability (be3=1 and CK=0). The register 82 is controlled at the sampling frequency Fe.

The memory 81 of FIG. 3a constitutes, together with its address register 80, four counters each defining four states which progress by feedback of two data bits (binary data elements) on the two low-weight address bits. Each counter is selected by the two coding bits of the "+", "−" transitions and of the high and low stable states delivered by the memory 7 of FIG. 1a (signal be 2,1). These four counters formed by means of a memory connected in a feedback loop through its address register 80 are:

a "+" transition counter which is addressed by the code of the "+" transitions (be 2,1=01) and delivers in a window having a time-duration 4/Fe, and at the rate of the sampling signal Fe, the four bits 0011 of the data signal D' and the four bits 1100 which restitute a binary clock signal Fd' by transition from level 1 to level 0 at the center of the window;

a "−" transition counter which is addressed by be 2,1=10 and delivers within a window the four bits 1100 of the data signal D' and the four bits 1100 of the clock signal Fd';

a low stable-state counter which is addressed by be 2,1=00 and delivers within a window the four bits 0000 of the signal D' and the four bits 1100 of the signal Fd';

a high stable-state counter which is addressed by be 2,1=11 and delivers in a window the four bits 1111 of the signal D' and the four bits 1100 of the signal Fd'.

FIG. 3b is an eight-column table which represents the "data relative to addresses" of the memory 81 of FIG. 3a. The first four columns are the address columns AD: the first and second columns represent the signal be 2,1 which addresses one of the four counters. The third and fourth columns represent the signals delivered by feedback of the memory 81 through its address register 80. This feedback is shown in FIG. 3b by means of three dashed-line arrows in the case of counting of the "+" transitions (be 2,1=01, columns 1 and 2). The last four columns of the table relate to the data DO. The fifth and sixth columns relate to the data employed in the feedback operation. The seventh column relates to the clock signal Fd' with its transition from 1 to 0 at the center of the window. The eighth column relates to the DIDON data signal D'.

The register 82 which receives the signals Fd' and D' and is controlled by the sampling signal Fe is intended to guard against the parasitic signals which appear at the time of changes of address. The register 82 delivers the regenerated clock signal Fd and the regenerated data signal D.

Figure 4:
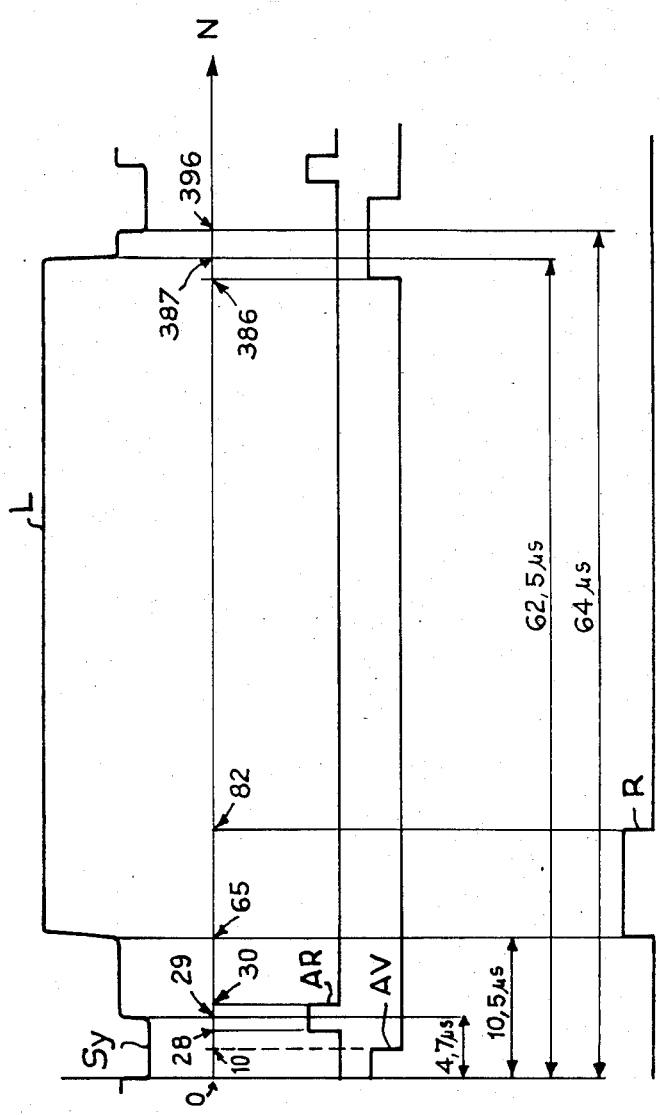

FIG. 4 is a time-waveform diagram which represents as a function of the N states of a counter: a television line L, a window signal of the trailing edge AR of the line synchronization signal, a window signal of the leading edge AV of the line-synchronization signal and a window signal R which serves in the validation circuit 13 of FIG. 1a to determine a signal for validation of the data delivered by the demodulator. For the sake of enhanced clarity of certain parts of the diagram of FIG. 4, the proportions have not been observed on the time axis or in other words on the axis of the states N.

In the case of the example herein described in which the DIDON data are transmitted by the SECAM process on 64 μs lines, the DIDON procedure has established the DIDON binary frequency FB at 397 times the line frequency, that is, 397×15.625 kHz=6.203125 MHz.

A time interval of 4.7 μs elapses from the leading edge of the line-synchronization signal Sy to the trailing edge of this signal; a time interval of 10.5 μs elapses from said leading edge to the start of the data signals; a time interval of 62.5 μs elapses from said leading edge to the end of the data signals; and a time interval of 64 μs elapses from the same leading edge to the leading edge of the following line-synchronization pulse. By counting in periods of the signal FB, that is, in a period of a signal whose frequency is that of the sampling signal Fe divided by four, and by initiating the counting operation at the start of the synchronization pulse (N=0), the trailing edge appears during states 28, 29, 30 (window AR in FIG. 4);
the following leading edge appears during states 386 to 10 (window AV in FIG. 4);
the validation signal, that is, the identification of a predetermined number (six in the example described) of the sixteen periods of the binary synchronization burst of the data signal, is permitted only during the window comprised between N=65 and N=82 (window R in FIG. 4).

Figure 5:
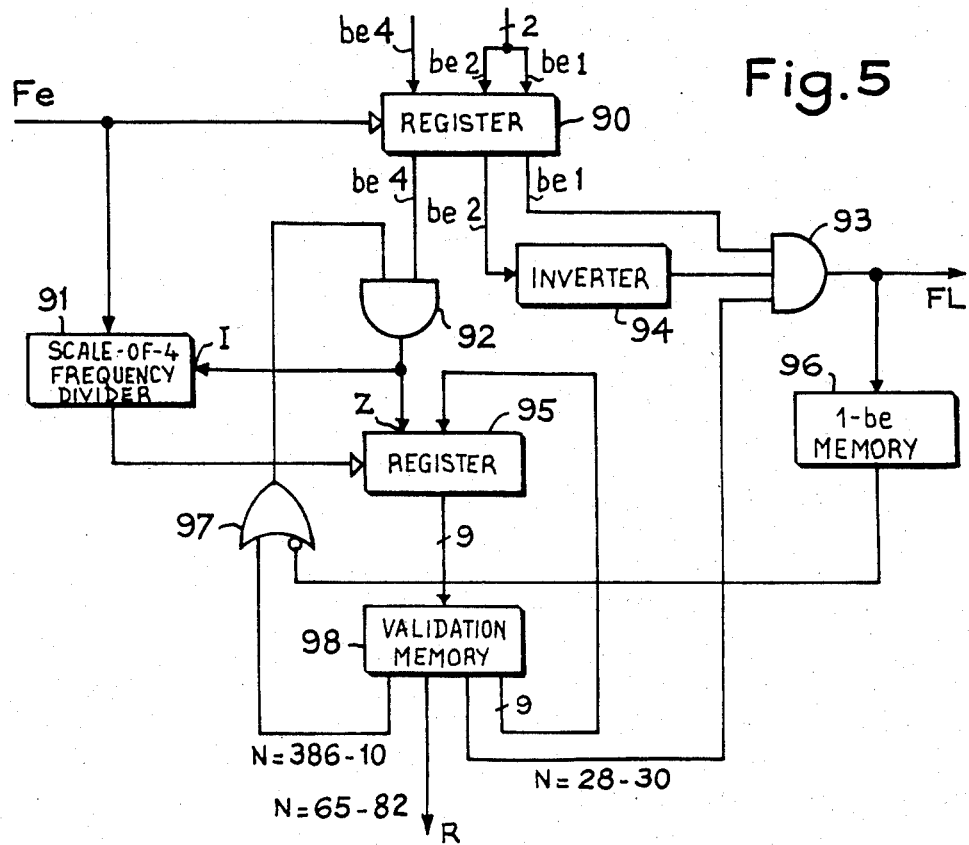

FIG. 5, which is a detailed view of the synchronization extraction circuit 9 of FIG. 1a shows the procedure adopted for obtaining the line-synchronization signal FL and the different windows referred to in the foregoing.

FIG. 5 shows a buffer register 90 which receives the signals be 2,1 and be4 from the probability memory 7 of FIG. 1. It is recalled that be 2,1 (or, equivalently, the signals be2 and be1 taken in this order) assumes the values 01, 10, 11 and 00 respectively at the time of identification by the memory 7 of a probable "+" transition, of a probable "−" transition, of a high stable-state, of a low stable-state, whilst be4=1 corresponds to identification of probable "−" transitions (since be 2,1=10) and "−" transitions which follow a low stable-state and which, as shown by the signal L of FIG. 4, are representative of a line-synchronization pulse.

The register 90 is controlled by the sampling signal Fe. The output of said register which corresponds to the signal be4 is connected to the first input of an AND-gate 92. The output of the AND-gate 92 is connected to the zero-reset input Z of a buffer register 95 and to the initialization input I of a scale-of-four divider 91, the input signal of which is the sampling signal and the output signal of which is the control signal of the register 95. This register is a nine-element register, the nine outputs of which are connected to the nine inputs of a programmable memory 98 designated as a validation memory having a capacity of 512×12 and connected in a feedback loop to the nine inputs of the register 95 so as to form a counter which is capable of counting from 0 to 396; this is the counter which supplies the states N=0 to N=396 mentioned earlier in the description with reference to FIG. 4.

The outputs of the register 90 corresponding to the signals be1 and be2 are connected respectively to the first input of an AND-gate 93 and to the second input of said AND-gate 93 through an inverter 94. The third input of the gate 93 receives a signal 1 when N assumes the values 28 to 30 (window AR of FIG. 4) and delivers the regenerated line-synchronization signal FL. This signal FL is applied to the input of a single-element memory 96 designated hereinafter as a 1-be memory. The output of said 1-be memory is connected to the first input, with inversion, of an OR-gate 97 which receives on its second input, without inversion, a signal 1 when N assumes the values 386 to 10 (window AV of FIG. 4) and the output signal of which is applied to the second input of the AND-gate 92. The signal R which assumes the value 1 when N assumes the values 65 to 82 (window R of FIG. 4) is delivered in addition at one output of the validation memory 98.

The "−" transitions indicated by the value 1 of the signal be4 which is applied to the register 90 deliver to the AND-gate 92 pulses for initiating zero-reset of the register 95. A point to be noted here is that, depending on the state of the signal be3 or in other words of the improbability bit, the time-duration of the zero-reset pulse delivered by the register 90 corresponds to either one or four sampling periods. The AND-gate 92 governs the transmission of the reset pulses by the window signal for searching the leading edge AV supplied by the memory 98. The reset pulse is considered as being representative of the leading edge of the line-synchronization pulse.

When they appear during the window signal for searching the trailing edge AR supplied by the memory 98, all the "+" transitions indicated by the signal be 2,1 of the memory 7 of FIG. 1a (code 01, that is, be2=0 and be1=1) are representative of the television line-synchronization signal Sy or, more specifically, of the rear portion of said signal. The regenerated line-synchronization signal FL is the output signal of the AND-gate 93.

As has been seen earlier, the memory 98 constitutes together with the register 95 a counter which has the function of counting from 0 to 396 at the sampling signal rate divided by four, that is to say at the rate of the DIDON binary frequency FB.

As long as the regenerated line-synchronization signal FL has not been detected, the 1-be memory 96 is at 0. Any "−" transition indicated by the signal be4 resets the counter to the state N=0. As a result of the first leading edge of the television line synchronization signal which is detected by the gate 93 (during the states 28 to 30 of the counter), the counter can thereafter be reset to zero only by the "−" transitions (be4=1) which appear at the line frequency (during the states 386 to 10 of the counter).

As already mentioned in the foregoing, the signal R delivered by the memory 98 and corresponding to the states 65 to 82 of the counter is intended to validate the identification of six periods of the two octets of the synchronization burst which appears at the start of the data signal. The burst identification signal which is validated by the signal R is the signal VAL obtained by means of the validation circuit 13 of FIG. 1a, the detailed diagram of which is given in FIG. 6. The function to be performed by the validation circuit 13 is to identify the configuration 010101 or 101010 during the time interval of the window R since, from the moment of identification of the start of a television line synchronization pulse, if DIDON data are transmitted, there will be a series of six bits formed of alternate 1s and 0s during the states 65 to 82 of the counter.

Figure 6:
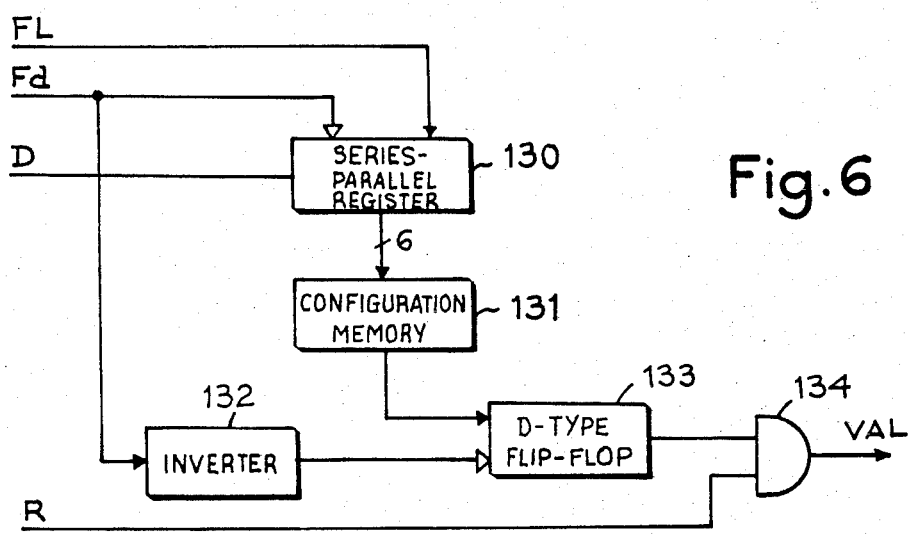

FIG. 6 shows that the validation circuit 13 of FIG. 1a comprises a series-parallel register 130 having six outputs which receives the regenerated data signal D on its signal input, the regenerated clock signal Fd on its shift control input and the regenerated line-synchronization signal FL on a zero-reset input. The six outputs of the register 130 are connected to the six inputs of a configuration memory 131 comprising a programmable read-only memory (PROM) having a capacity of 64×1, the output of which is connected to the signal input of a D-type flip-flop 133, that is to say a bistable circuit which assumes the state of the signal applied to its signal input when a pulse is applied to its clock input. The signal $\overline{Fd}$, that is, the regenerated clock signal which has been inverted by an inverter 132, is applied to the clock input of the flip-flop 133, the output of which is connected to the first input of an AND-gate 134. The second input of said gate receives the datavalidation window signal R and the gate output delivers the data-validation signal.

The register 130 which receives the regenerated data D and which is shifted by the regenerated clock signal Fd addresses the memory 131 which is programmed for identifying the configurations 010101 and 101010. Identification of one of these configurations initiates emission of the VAL signal which is shaped by means of the flip-flop 133 and transmission of which is permitted by the AND-gate 134 only if it has been generated during the states 65 to 82 of the counter 95, 98 of FIG. 5 (signal R applied to the AND-gate 134 of FIG. 6).

The present invention is not limited to the example described in the foregoing and extends in particular to any demodulator comprising an input analog-to-digital conversion device (elements 1 to 4 of FIG. 2), the sampling frequency of which is an integral multiple n of the binary frequency FB of the DIDON signal and the output signal of which is scanned. This scanning operation consists in detecting probable configurations of the DIDON signal over time intervals equal to the period T=1/FB and then, by means of these probable configurations, in regenerating the data signal with its clock and possibly also the line-synchronization signal and validation signals based, for example, on identification or nonidentification of the binary synchronization burst of a television line comprising DIDON data. In regard to the input analog-to-digital conversion device, a value other than 4 may be adopted for the number n which defines the sampling frequency of the device. Nevertheless, the value n=2 is to be excluded since the signal obtained during the DIDON period (1/FB) would be too accurate to permit estimation of its probability or its improbability and the value n=3 would be slightly too low to decide on the probability of the signal obtained. Furthermore, the analog-to-digital conversion device could be constructed, for example, by means of an automatic gain control (AGC) amplifier followed by an analog-to-digital converter which is in turn followed by a scanning memory of the same type as the memory 4 of FIG. 1a.

What is claimed is:

1. A DIDON digital demodulator comprising:
   analog-to-digital conversion means for (a) receiving a DIDON television video signal having a progressive variation and (b) delivering successive inter-sample signals at the frequency n×FB, n being a positive whole number at least equal to 4 and FB being a binary frequency of the DIDON signal, said successive inter-sample signals being representative of the progressive variation of said video signal from one sampling period to the next;
   identifying means for (a) identifying as a function of pre-established criteria configurations of n successive inter-sample signals which are probable configurations representative of a DIDON signal and (b) delivering (b1) auxiliary signals which indicate whether or not a configuration is identified as being representative of a DIDON signal, (b2) configuration signals which correspond to low-high "+" and high-low "−" transitions, and to high and low stable states of the DIDON signal; and
   data-regenerating means for receiving the configuration signals and regenerating a data signal and a clock signal when the configurations corresponding to said configuration signals are probable configurations representative of a DIDON signal.

2. A demodulator according to claim 1, wherein said conversion means includes:
   an analog-to-digital converter for supplying video-signal samples at the frequency n×FB;
   substractive means for supplying at the frequency n×FB subtractive signals which are representative of the difference between the samples delivered by the converter and the same samples delayed by 1, and n×FB
   scanning memory means for receiving the substractive signals, said memory means being programmed for delivering an inter-sample signal comprising a signal having a zero difference for a subtractive signal which is lower at absolute value than a predetermined threshold, and a signal having a difference + or − according to the sign of the subtractive signal if said subtractive signal is higher than the given threshold at absolute value.

3. A DIDON demodulator according to claim 2, wherein said identifying means include:
   register means for receiving the difference signals and for delivering at the frequency n.FB a window signal formed by the n last difference signals received;
   memory means being provided with a control input; and
   study means for (a) producing the configuration signals as a function of the pre-established criteria, (b) producing auxiliary signals, said auxiliary signals comprising a first signal for identifying improbable configurations, that is configurations which have been identified as being representative of no DIDON signal, and a second signal for identifying a leading-edge transition of a synchronization signal and for identifying a transition of a same type as the leading-edge transition, that is a low-high or a high-low transition according to whether said leading edge transition is a low-high or a high-low transition;
   an electronic switch controlled by the first signal, one output of said switch being connected to a control input of the memory means for delivering a signal at the frequency FB or a signal at the frequency n×FB according to whether the first signal corresponds to a probable configuration or not.

4. A DIDON demodulator according to claim 3, wherein the data-regenerating means includes:
   a signal input for receiving the configuration signals; and
   an input for receiving from said electronic switch the signal at the frequency n×FB and no signal at all respectively when the first signal corresponds to a probable configuration or to an improbable configuration, said data regenerating means providing a regenerated data signal having a time-duration 1/FD when the configuration is probable and presenting four different values respectively corresponding to whether the configuration is a "+" transition, a "−" transition, a low stable-state or a high stable-state, said data regeneration means also providing a regenerated clock signal in synchronism with a center of a time duration 1/FD of said regenerated data signal.

5. A DIDON demodulator according to claim 3 further including a synchronization extraction circuit for utilizing the configuration signals and the second signal in order to identify the leading edge of line-synchronization signals of said DIDON television video signal, said synchronization extraction circuit being provided with a counter for producing a regenerated line-synchronization signal and a data-validation window signal from an instant of identification of the leading edge of a line-synchronization signal.

6. A DIDON demodulator according to claim 3, wherein said data-regenerating circuit includes:

signal input means for receiving the configuration signals;

input means for receiving from the electronic switch the signal at the frequency n×FB and no signal at all respectively when the first signal corresponds to a probable configuration or to an improbable configuration, said data regenerating means providing a regenerated data signal having a time-duration 1/FD when the configuration is probable and presenting four different values respectively corresponding to whether the configuration is a "+" transition, a "−" transition, a low stable-state or a high stable-state, said data regeneration means also providing a regenerated clock signal in synchronism with a center of a time duration 1/FD of said regenerated data signal, said DIDON demodulator comprising a synchronization extraction circuit for utilizing the configuration signals and the second signal in order to identify the leading edge of line-synchronization signals of said DIDON television video signal, said synchronization extraction circuit being provided with a counter for producing a regenerated line-synchronization signal and a data-validation window signal from an instant of identification of the leading edge of a line-synchronization signal.

7. A DIDON demodulator according to claim 6, further including validation means for producing a data-validation signal, said validation means having means for identifying a synchronization burst which appears at a start of a DIDON data signal by identifying a predetermined number of alternate 0s and 1s in the regenerated data signal during the data-validation window signal.

* * * * *